United States Patent Office 3,356,737
Patented Dec. 5, 1967

3,356,737
METHOXY CHLOROBENZYL ALCOHOLS
Sidney B. Richter, Chicago, Ill., assignor to Velsicol Chemical Corporation, Chicago, Ill., a corporation of Illinois
No Drawing. Filed Sept. 3, 1964, Ser. No. 394,317
3 Claims. (Cl. 260—613)

This application is a continuation-in-part of my copending applications Ser. Nos. 125,382 and 125,384, filed July 20, 1961, now abandoned.

The present invention relates to new polychloro monoalkoxy substituted benzyl alcohols. In particular this invention relates to compounds represented by the following structural formula:

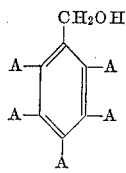

wherein A is selected from the group consisting of lower alkyl, lower alkoxy, chlorine and hydrogen provided that at least two of the A's are chlorine and one of the A's is lower alkoxy. In certain instances it is preferred that the number of chlorine atoms present on the ring be 2 or 3.

These new compounds have been found to possess remarkable herbicidal and aphicidal activity. Further they have utility as intermediates, particularly in the manufacture of esters by reaction of the present benzyl alcohols with a carboxylic acid. Still other compounds can be prepared by reaction of the hydroxy group attached to the methylene group.

Various procedures can be used in the preparation of these compounds. One particularly useful process is by reduction of the corresponding benzoic acid, which acids can be manufactured by the alkylation of a monohydroxy, polychlorobenzoic acid having its substituents in the same positions as those of the final product. Also the corresponding esters and aldehydes can be used with substantially equal efficiency. Process details are set forth in the following examples.

EXAMPLE 1

*Methylation of 3,6-dichlorosalicylic acid*

3,6-dichlorosalicylic acid (168 grams; 0.8 mol) was dissolved in acetone (500 ml.) contained in a glass reaction flask equipped with reflux condenser, stirrer and thermometer. Potassium carbonate (235 grams; 1.7 mol) was added thereto with stirring. The dimethylsulfate (214 grams; 1.7 mol) was added to the mixture which was refluxed for 17 hours. After cooling the potassium carbonate was removed by filtration and the acetone distilled off to recover the desired methyl ester of 2-methoxy 3,6-dichlorobenzoic acid as a colorless liquid.

EXAMPLE 2

*Preparation of 2-methoxy-3,6-dichlorobenzyl alcohol*

Methyl ester of 2-methoxy-3,6-dichlorobenzoic acid (119 grams; 0.5 mol) was added to a solution of lithium aluminum hydride (30.4 grams; 0.8 mol) and ether (250 ml.) the latter being rapidly stirred in a glass reaction flask equipped with stirrer, thermometer, reflux condenser and addition funnel. This addition took 45 minutes during which time the temperature of the mixture rose to 34° C. It was then refluxed with stirring for 3½ hours. After being cooled, water (50 ml.) was added dropwise and then hydrochloric acid was added until all solid material dissolved and the mixture became clear. The ether layer was separated from the aqueous layer, the latter washed with ether and the ether extract combined with the original ether layer. This combined extract was washed with water, dried, filtered and evaporated to obtain a white solid which upon recrystallization twice from hexane had a melting point of 68–69° C.

It was analyzed for $C_8H_8Cl_2O_2$. Theoretical: C, 46.40%; H, 3.89%; Cl, 34.25%. Found: C, 46.30%; H, 3.78%; Cl, 34.14%.

EXAMPLE 3

*Preparation of 3-methoxy-2,6-dichlorobenzyl alcohol*

Lithium aluminum hydride (19 grams; 0.5 mol) and diethyl ether (one liter) were placed in a glass reaction flask equipped with stirrer, thermometer and addition funnel. 2,6-dichloro-3-methoxy benzaldehyde (111.9 grams; 0.6 mol) was suspended in diethyl ether (3 liters) and added to the reaction flask over a 30 minute addition period keeping the temperature of the reaction mixture below −15° C. Then the mixture was stirred at a temperature of −10 to −20° C. for an additional 4 hours. Acetone (100 ml.) was added dropwise and then hydrochloric acid was added until two clear layers were formed. The ether layer was removed, the aqueous layer washed with ether and the washings combined with the original ether layer. This ether solution was washed with water, dried, filtered and the ether evaporated to obtain the desired solid product. After two recrystallizations from ethanol and one from hexane it was found to have a melting point of 78.5–80° C.

It was analyzed for $C_8H_8Cl_2O_2$. Theoretical: C, 46.40%; H, 3.89%; Cl, 34.25%. Found: C, 46.80%; H, 4.03%; Cl. 34.27%.

EXAMPLE 4

*Preparation of methyl-(2-methoxy-3,5-dichloro-4,6-dimethyl)benzoate*

2-hydroxy-3,5-dichloro-4,6-dimethyl benzoic acid (6 grams; 0.026 mole) in acetone (280 ml.) was placed in a reaction flask equipped with thermometer, stirrer, addition funnel and reflux condenser. Potassium carbonate (13.8 grams) was added and the mixture was heated to just below reflux. Dimethyl sulfate (5.68 ml.; 0.06 mole) was added dropwise and the mixture refluxed for 5 hours with stirring. Then it was filtered, the filter cake washed with acetone and the washings combined with the filtrate. The acetone was then evaporated leaving a solid product which upon being recrystallized from pentane was found to have a melting point of 72–74° C.

It was analyzed for $C_{11}H_{12}Cl_2O_3$. Theoretical: C, 50.21%; H, 4.60%; Cl, 26.95%. Found: C, 51.04%; H, 4.13%; Cl, 27.54%.

EXAMPLE 5

*Preparation of 2-methoxy-3,5-dichloro-4,6-dimethyl benzyl alcohol*

Lithium aluminum hydride (1 gram) in diethyl ether (100 ml.) was placed in a glass reaction flask equipped with stirrer, thermometer, reflux condenser and addition funnel. Methyl-(2 - methoxy-3,5-dichloro-4,6-dimethyl)-benzoate (5 grams) was added and the mixture refluxed for 5 hours. Water was added until the mixture stopped refluxing and then hydrochloric acid was added until the mixture became clear. The ether layer was separated, the aqueous layer washed with ether and the washings combined with the original ether layer. Then the ether solution was washed with water, dried and the ether evaporated leaving solid product which after recrystallization from hexane had a melting point of 105.5–108° C.

It was analyzed for $C_{10}H_{12}Cl_2O_2$. Theoretical: C, 51.08%; H, 5.14%; Cl, 30.16%. Found: C, 51.16%; H, 5.02%; Cl, 30.82%.

EXAMPLE 6

*Preparation of methyl-2-methoxy-3,5,6-(trichloro)-benzoate*

3,5,6-trichlorosalicylic acid (669 grams; 2.77 moles) was placed in a glass reaction flask equipped with heating mantle, thermometer, stirrer and reflux condenser and containing acetone (9 liters). Potassium carbonate (386 grams) was added with continual stirring. After the temperature of this mixture was brought almost to reflux, dimethyl sulfate (530 ml.; 5.6 moles) was added and the mixture allowed to reflux with stirring. After being cooled, the reaction mixture was filtered to remove the potassium carbonate. The acetone was evaporated leaving an oily liquid product boiling at 140° C. at 0.5 mm. Hg and having a refractive index at 27.5° C. of 1.5499.

Analysis for $C_9H_7Cl_3O_3$ showed the following. Theoretical: C, 40.10%; Cl, 39.4%; H, 2.63%. Found: C, 39.60%; Cl, 39.5%; H, 2.47%.

EXAMPLE 7

*Preparation of 2-methoxy-3,5,6-trichlorobenzyl alcohol*

Lithium aluminum hydride (5 grams; 0.013 mol) was placed in a glass reaction flask equipped with stirrer, thermometer and cooling bath. Anhydrous ether (500 ml.) was added and the solution cooled to −70° C. Methyl-(2-methoxy-3,5,6-trichloro)-benzoate, prepared as described in Example 6, dissolved in anhydrous ether (400 ml.) was added over a ½ hour addition period while maintaining the temperature of the reaction mixture at about −70° C. Stirring was performed during this addition and for 2 additional hours while holding the temperature at about −50° C. Water (20 ml.) was added dropwise, followed by addition of hydrochloric acid (300 ml. of a 20% solution). The aqueous layer was separated, washed with ether, dried over magnesium sulfate and evaporated to leave a white solid product. After being recrystallized from benzene it had a melting point of 76–78° C. and then was analyzed for $C_8H_7Cl_3O_2$.

Theoretical: C, 39.78%; H, 2.92%. Found: C, 39.66%; H, 3.00%.

A second method of preparation involves the reaction of a polychlorophenol and formaldehyde to form a polychloro hydroxy benzyl alcohol in accordance with the procedure of United States Patent 2,631,169. Then by alkylation of the hydroxy group using a suitable alkylation reactant such as a dialkyl sulfate or an alkyl chloride the benzyl alcohol corresponding to the above structure can be obtained. This method is suited for the production of the present compounds wherein the alkoxy group is ortho to the alcohol group.

EXAMPLE 8

*Preparation of 2-hydroxy-3,5,6-trichlorobenzyl alcohol*

Formaldehyde (327.0 grams of a 35% water solution; 3.8 mol) was placed in a glass reaction flask and heated to 40° C. A solution of 2,4,5-trichlorophenol (250 grams; 2 mols) and sodium hydroxide (50.1 grams; 2.2 mols) in water (635 ml.) was slowly added into the reaction flask. This mixture was stirred for 16½ hours at 45–50° C., for an additional ¾ hour at 88° C. and then maintained at about the latter temperature for an additional hour. After being cooled to room temperature carbon dioxide was bubbled through the reaction mixture until its pH was about 5. Hydrochloric acid was added and the mixture extracted three times with ether. The ether extracts were washed with water, dried, and the ether evaporated to leave about 200 grams of the desired product.

EXAMPLE 9

*Preparation of 2-methoxy-3,5,6-trichlorobenzyl alcohol*

2-hydroxy-3,5,6-trichlorobenzyl alcohol (120 grams; 0.094 mol) prepared in Example 8 was dissolved in acetone (150 ml.) contained in a glass reaction flask equipped with reflux condenser, stirrer, heating mantle and thermometer. Potassium carbonate (13 grams) was added and the reaction mixture heated to reflux. Dimethyl sulfate (12 grams; 0.1 mol) was added and the mixture held at reflux for 3 hours. After cooling, the reaction mixture was filtered and the desired product recovered. This solid was worked up in acetone, and the acetone evaporated. It was then dissolved in ether, dried over magnesium sulfate and the ether evaporated to obtain 20.4 grams of the desired product. After two recrystallizations from a mixture of benzene and pentane it had a melting point of 78–80.5° C.

It was analyzed for $C_8H_7Cl_3O_2$. Theoretical: C, 39.78%; Cl, 44.04%; H, 2.92%. Found: C, 40.72%; Cl, 43.13%; H, 3.04%.

Accordingly by using selected benzoic acid starting materials in the first procedure as detailed in Examples 1–7 various compounds included within the scope of the present invention can be readily obtained. The position of the chlorine, alkoxy, hydrogen and alkyl substituents on the aromatic nucleus of the final product will be identical with those on the benzoic acid reactant as further illustrated by the following examples:

| Starting Material | Alkylating Agent | Final Product |
|---|---|---|
| 2-hydroxy-5,6-dichloro benzoic acid. | Diethyl sulfate. | 2-ethoxy-5,6-dichloro benzyl alcohol. |
| 3-hydroxy-5,6-dichloro benzoic acid. | Didecyl sulfate. | 2-decoxy-5,6-dichloro benzyl alcohol. |
| 2-hydroxy-3,5-dichloro-4-ethyl benzoic acid. | Dipentyl sulfate. | 2-pentoxy-3,5-dichloro-4-ethyl benzyl alcohol. |
| 3-hydroxy-2,6-dichloro-5-octyl benzoic acid. | Ditetradecyl sulfate. | 3-tetradecoxy-2,6-dichloro-5-octyl benzyl alcohol. |
| 2-hydroxy-3,6-dichloro-4,5-dipropylbenzoic acid. | Dinonyl sulfate. | 2-nonoxy-3,6-dichloro-4,5-dipropyl benzyl alcohol. |
| 3-hydroxy-5,6-dichloro-2,4-dipentyl benzoic acid. | Diphentyl sulfate. | 3-pentoxy-5,6-dichloro-2,4-dipentyl benzyl alcohol. |
| 2-hydroxy-3,6-dichloro-5-octyl benzoic acid. | Dinonyl sulfate. | 2-nonoxy-3,6-dichloro-5-octyl benzyl alcohol. |
| 3-hydroxy-2,6-dichloro-4,5-dimethyl benzoic acid. | Diundecyl sulfate. | 3-undecoxy-2,6-dichloro-4,5-dimethyl benzyl alcohol. |
| 2-hydroxy-3,5-dichloro-4-heptyl benzoic acid. | Didodecyl sulfate. | 2-dodecoxy-3,5-dichloro-4-heptyl benzyl alcohol. |
| 3-hydroxy-2,4,5-trichloro benzoic acid. | Dimethyl sulfate. | 3-methoxy-2,4,5-trichloro benzyl alcohol. |
| 3-hydroxy-2,4,6-trichloro benzoic acid. | Diethyl sulfate. | 3-ethoxy-2,4,6-trichloro benzyl alcohol. |
| 3-hydroxy-4,5,6-trichloro benzoic acid. | Dipropyl sulfate. | 3-propoxy-4,5,6-trichloro benzyl alcohol. |
| 4-hydroxy-2,3,5-trichloro benzoic acid. | Dipentyl sulfate. | 4-pentoxy-2,3,5-trichloro benzyl alcohol. |
| 4-hydroxy-2,3,6-trichloro benzoic acid. | Diheptyl sulfate. | 4-heptoxy-2,3,6-trichloro benzyl alcohol. |
| 4-hydroxy-3,5,6,-trichloro benzoic acid. | Dihexyl sulfate. | 4-hexoxy-3,5,6,-trichloro benzyl alcohol. |
| 3-hydroxy-2,4,5-trichloro-6-propyl benzoic acid. | Dibutyl sulfate. | 3-butoxy-2,4,5-trichloro-6-propyl benzyl alcohol. |
| 4-hydroxy-2,3,6-trichloro-5-decyl benzoic acid. | Dioctyl sulfate. | 4-octoxy-2,3-6-trichloro-5-decyl benzyl alcohol. |
| 3-hydroxy-4,5,6-trichloro-2-pentyl benzoic acid. | Dinonyl sulfate. | 3-nonoxy-4,5,6-trichloro-2-pentyl benzyl alcohol. |
| 3-hydroxy-2,4,6-trichloro-5-heptylbenzoic acid. | Dimethyl sulfate. | 3-methoxy-2,4,6-trichloro-5-heptylbenzyl alcohol. |
| 4-hydroxy-2,3,5-trichloro-6-hexyl-benzoic acid. | Ditetradecyl sulfate. | 4-tetradecoxy-2,3,5-trichloro-6-hexyl benzyl alcohol. |
| 2-undecyl-4-hydroxy-3,5,6-trichlorobenzoic acid. | Dipropyl sulfate. | 2-undecyl-4-methoxy-3,5,6-trichlorobenzyl alcohol. |

If desired in the above list of examples instead of using the benzoic acid starting material, the corresponding aldehyde or an ester of the benzoic acid reactant can be utilized to obtain the same final product. The above list is exemplary of compounds within the scope of the present invention and it is clear that a variety of combinations of substituents on the benzene nucleus are included within the scope of the present invention. The production of these other compounds requires a mere substitution of reactants in accordance with the present teachings.

By using the second outlined procedure (Examples 8 and 9) the use of the following phenols and alkylating agents will result in the specified benzyl alcohol.

| Starting Material | Alkylating Agent | Final Product |
| --- | --- | --- |
| 2,3,4-trichloro-phenol | Dimethyl sulfate | 2-methoxy-3,4,5-trichlorobenzyl alcohol. |
| ,3,5-trichloro-phenol | do | 2-methoxy-3,4,6-trichlorobenzyl alcohol. |
| 3,4,5-trichloro-phenol | do | 2-methoxy-4,5,6-trichlorobenzyl alcohol. |
| 2,3,4-trichloro-5-methyl phenol. | Diethyl sulfate | 2-ethoxy-3-methyl-4,5,6-trichlorobenzyl alcohol. |
| 2,3,4-trichloro-5-ethyl phenol. | Didecyl sulfate | 2-decoxy-3-ethyl-4,5,6-trichlorobenzyl alcohol. |
| 2,3,4-trichloro-5-octyl phenol. | Ditetradecyl sulfate. | 2-tetradecoxy-3-octyl-4,5,6-trichlorobenzyl alcohol. |
| 2,3,5-trichloro-4-ethylphenol. | Diethyl sulfate | 2-ethoxy-4-ethyl-3,5,6-trichlorobenzyl alcohol. |
| 2,3,5-trichloro-4-butylphenol. | Dipropyl sulfate | 2-propoxy-4-butyl-3,5,6-trichlorobenzyl alcohol. |
| 2,4,5-trichloro-4-methylphenol. | Dipentyl sulfate | 2-pentoxy-4-methyl 3,5,6-trichlorobenzyl alcohol. |
| 2,4,5-trichloro-4-pentylphenol. | Diundecyl sulfate | 2-undecoxy-4-pentyl-3,5,6-trichlorobenzyl alcohol. |
| 2,4,5-trichloro-4-tridecylphenol. | Dihexyl sulfate | 2-hexyl-4-tridecyl-3,5,6-trichlorobenzyl alcohol. |
| 2-heptyl-3,4,5-trichlorophenol. | Dibutyl sulfate | 2-butoxy-3,4,5-trichloro-6-heptyl-benzyl alcohol. |
| 2-propyl-3,4,5-trichlorophenol. | Dinonyl sulfate | 2-nonoxy-3,4,5-trichloro-6-propyl-benzyl alcohol. |

As previously indicated the present compounds have substantial aphicidal and herbicidal activity. In order to determine this activity, several tests were performed, as follows:

2-methoxy-3,5-dichloro-4,6-dimethyl benzyl alcohol was tested as a systemic aphicide. This compound was dissolved in acetone and then dispersed in distilled water at concentrations of 100, 10 and 1 parts per million. Host plants infested with adult pea aphids were uprooted, washed free of soil and placed in glass jars containing 100 cc. of the dispersed test compound. Aluminum foil was placed around the plant stem and jar to reduce possible escape of toxic vapors from the test dispersion. Then the test plants were maintained in the greenhouse for 72 hours and then observed for systemic aphicidal effectiveness. Three replicates were used for each treatment. At each of the concentrations the percent mortality of the pea aphids was 100%. Thus at these low concentrations the present compounds are extremely effective.

3-methoxy-2,6-dichloro benzyl alcohol was also tested as a systemic aphicide. It was dissolved in acetone and then dispersed in water at a concentration of 100 parts per million. Host plants infested with adult pea aphids were uprooted, washed free of soil and placed in a glass jar containing 100 cc. of the dispersed test compound. Aluminum foil was placed around the plant stem and jar to reduce possible escape of toxic vapors from the test dispersion. Then the test plants were maintained in the greenhouse for 72 hours and observed for systemic aphicidal effectiveness. Three replicates were used. The percent mortality of the pea aphids was 100%.

2-methoxy-3,6-dichlorobenzyl alcohol was also tested as a systemic aphicide. This compound was dissolved in acetone and then dispersed in water at a concentration of 100 parts per million. Host plants infested with adult pea aphids were uprooted, washed free of soil and placed in a glass jar containing 100 cc. of the dispersed test compound. Aluminum foil was placed around the plant stem and jar to reduce possible escape of toxic vapors from the test dispersion. Then the test plants were maintained in the greenhouse for 72 hours and observed for systemic aphicidal effectiveness. Three replicates were used. The percent mortality was 90%.

In addition the compounds of the present invention have superior herbicidal activity. The following tests were performed to substantiate the presence of this activity.

Duplicate paper pots filled with a sand and soil mixture were seeded with pigweed, mustard and foxtail. Immediately after seeding, the soil surface of each pot was sprayed with a solution of 2-methoxy-3,6-dichlorobenzyl alcohol at a rate of four pounds per acre of soil. The plants were allowed to grow under artificial lighting with irrigation provided by placing the porous pots in a small amount of water in stainless steel trays. The weeds were observed for a week to ten days. At that time the weeds were observed for injury using the following scale: 1—no injury; 2—slight injury; 3—moderate injury; 4—severe injury; 5—death. Each of the weeds showed severe injury at the conclusion of the test period or a 4 on the foregoing scale.

Additional tests were performed on the pre-emergent herbicidal activity of 2-methoxy-3,6-dichlorobenzyl alcohol. Containers were filled with crabgrass, foxtail, mustard, and pigweed seeds. Twenty-four hours after the seeding a solution of 2-methoxy-3,6-dichlorobenzoic alcohol was sprayed on the surface of the soil of one set of containers at a rate of four pounds per acre and upon a duplicate set of containers at a rate of eight pounds per acre. Supplemental light and heat were supplied as required. The containers of soil were watered daily or more frequently as required. The injury to the weeds was determined three weeks after the date the test solution was applied to the weeds using the following scale: 0—no injury; 1,2—slight injury; 3,4—moderate injury; 5,6—moderately severe injury; 7,8,9—severe injury; 10—death. The weed injury was as follows:

| Rate of Application (lbs./acre) | Crabgrass | Mustard | Foxtail | Pigweed |
| --- | --- | --- | --- | --- |
| 4 | 9 | 7 | 9 | 6 |
| 8 | 10 | 8 | 10 | 9 |

In order to confirm the selective pre-emergent herbicidal activity of 2-methoxy-3,6-dichlorobenzyl alcohol an emulsifiable concentrate containing one pound of the alcohol per gallon was sprayed on soil seeded in continuous rows with oats, wheat and corn as well as lambsquarter, pigweed, velvet leaf and foxtail. Readings on the weeds were taken three weeks after spraying the area with the test material at application rates of ½, 1 and 2 pounds per acre. Crop injury was determined five weeks after the spraying.

The percent control of the various weeds was as follows:

| Rate of Application (lbs./acre) | Foxtail | Lambs-quarter | Pigweed | Velvet Leaf |
| --- | --- | --- | --- | --- |
| 2 | 60.6 | 100.00 | 98.2 | 80.8 |
| 1 | 51.6 | 93.7 | 96.3 | 73.1 |
| ½ | 23.6 | 88.5 | 85.5 | 69.7 |

In no instance was there any reported injury to the corn, oats, or wheat crops at the various rates of application.

Duplicate paper pots filled with a sand and soil mixture were seeded with mustard and pigweed. Immediately after seeding the soil surface of each pot was sprayed with a solution of 3-methoxy-2,6-dichlorobenzyl alcohol at a rate of four pounds per acre of soil. The plants were allowed to grow under artificial lighting with irrigation provided by placing the porous pots in a small amount of water in stainless steel trays. The weeds were observed for a week to ten days. At that time the weeds were observed for injury using the previously described scale wherein 5 signifies death. The results of these tests were the test compound inflicted severe injury ("4" on the rating scale) to both the mustard and the pigweed.

Containers were filled with lambsquarter and pigweed seeds. Twenty-four hours after the seeding a solution of 2-methoxy-3,5,6-trichlorobenzyl alcohol was sprayed on the surface of the one set of containers at a rate of two pounds per acre and upon a duplicate set of containers at a rate of eight pounds per acre. Supplemental light and heat were supplied as required. The containers of soil were watered daily or more frequently as required. The injury to the weeds was determined three weeks after application of the test material to the weeds using the scale described above wherein 10 signifies death. The weed injury was as follows:

| Rate of Application (lbs./acre) | Weed Injury | |
|---|---|---|
| | Lambsquarter | Pigweed |
| 2 | 10 | 8 |
| 8 | 10 | 10 |

Herbicidal and aphicidal formulations of the present compounds are prepared by mixing one or more of the new compounds with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium lauryl sulfate and sodium lignin sulfonate. Other pesticides as well as such substances as fertilizers, activators, adhesives, spreaders and synergists can be added to these formulations if desired. The manner in which typical pesticidal compositions according to this invention can be prepared is illustrated in the following examples. All quantities given are in parts by weight.

EXAMPLE 10

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

2-methoxy-3,5-dichlorobenzyl alcohol _____ 25
Sodium lauryl sulfate _____ 5
Kerosene _____ 70

EXAMPLE 11

*Preparation of a wettable powder*

The following components are mixed intimately in conventional mixing or blending equipment and are then ground to a powder having an average particle size of less than about 50 microns. The finished powder is dispersed in water to give the desired concentration of active compound.

3-methoxy-2,6-dichlorobenzyl alcohol _____ 75.00
Fuller's earth _____ 22.75
Sodium lauryl sulfate _____ 2.00
Methyl cellulose _____ .25

EXAMPLE 12

*Preparation of an oil-dispersible powder*

The following components are blended and ground as described in the previous example to give a powder which can be dispersed in oil to form a spray containing the desired concentration of active compound.

2-methoxy-3,6-dichlorobenzyl alcohol _____ 70
Condensation product of diamylphenol with ethylene oxide _____ 4
Fuller's earth _____ 26

EXAMPLE 13

*Preparation of a dust*

The following ingredients are mixed thoroughly and then ground to an average particle size of less than about 50 microns to give a dust suitable for application with conventional dusting equipment.

2-methoxy-3,5,6-trichlorobenzyl alcohol _____ 20
Talc _____ 80

EXAMPLE 14

*Preparation of a granular formulation*

The following ingredients are mixed with sufficient water to form a paste, which is then extruded, dried and ground to give granules, preferably from about 1/32 to 1/4 inch in diameter. The granules are applied with fertilizer spreader equipment or other conventional apparatus. The dextrin in this formulation serves as a binding agent.

2-methoxy-4-methyl-3,6-dichlorobenzyl alcohol _____ 10
Fuller's earth _____ 66
Dextrin _____ 20
Sodium lignin sulfonate _____ 3
Kerosene _____ 1

I claim:
1. A compound selected from the group consisting of 2-methoxy-3,6-dichlorobenzyl alcohol and 3-methoxy-2,6-dichlorobenzyl alcohol.
2. 2-methoxy-3,6-dichlorobenzyl alcohol.
3. 3-methoxy-2,6-dichlorobenzyl alcohol.

References Cited

UNITED STATES PATENTS 2,327,338  8/1943  Carswell _____ 260—612
2,615,823  10/1952  Lawlor et al. _____ 260—612

FOREIGN PATENTS 977,613  4/1951  France.

OTHER REFERENCES

Bradsher et al.: Jour. Amer. Chem. Soc., vol. 79, pp. 1468–1470 (1957).

LEON ZITVER, *Primary Examiner.*

H. MARS, *Assistant Examiner.*

UNITED STATES PATENT OFFICE
CERTIFICATE OF CORRECTION

Patent No. 3,356,737  December 5, 1967

Sidney B. Richter

It is hereby certified that error appears in the above numbered patent requiring correction and that the said Letters Patent should read as corrected below.

Column 4, in the table, second column, line 15 thereof, for "Dipheptyl" read -- Diheptyl --; column 5, in the table, first column, line 2 thereof, for ",3,5-trichloro-phenol" read -- 2,3,5-trichloro-phenol --.

Signed and sealed this 11th day of March 1969.

(SEAL)
Attest:

Edward M. Fletcher, Jr.  
Attesting Officer

EDWARD J. BRENNER  
Commissioner of Patents